Dec. 11, 1923.
A. W. CARPENTER
1,476,874
PROCESS OF MAKING MOTTLED COLOR SCREENS
Filed Nov. 15, 1919
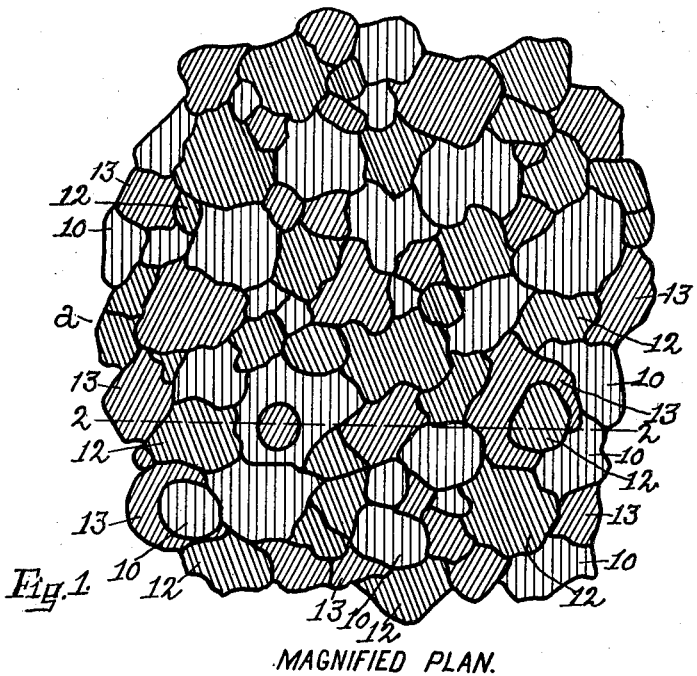
Fig. 1. MAGNIFIED PLAN.
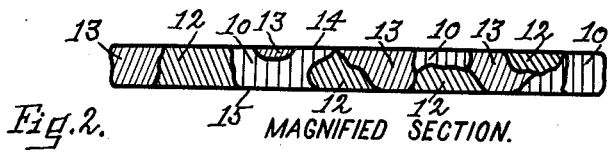
Fig. 2. MAGNIFIED SECTION.
INVENTOR
Arthur W. Carpenter
BY
Jas. H. Churchill
ATTORNEY Patented Dec. 11, 1923.

1,476,874

UNITED STATES PATENT OFFICE.

ARTHUR W. CARPENTER, OF NEW YORK, N. Y.

PROCESS OF MAKING MOTTLED COLOR SCREENS.

Application filed November 15, 1919. Serial No. 338,343.

*To all whom it may concern:*

Be it known that I, ARTHUR W. CARPENTER, a citizen of the United States, and a resident of the city, county, and State of New York, have invented an Improvement in Processes of Making Mottled Color Screens, of which the following description is a specification.

This invention relates to a novel process of making mottled color screens especially useful in the production of a color record plate or film of the prevailing screen plate type for color record purposes, and which is produced by the manipulation of any selected series of coloring agents, together with any suitable carrying base or bases.

Each of the selected dyes or coloring agents should exhibit a transmission or absorption spectrum which it is desired shall constitute one component of the final color screen.

The medium selected to be used as a carrying base for the coloring agents should possess, in combination, the following properties:—It should be transparent or possess a relatively high degree of translucency. It should stain thoroughly and uniformly throughout its mass when suitably subjected to the action of the selected dyes. It must be reducible to a fine or impalpable dust, preferably by manipulation as hereinafter described. When once reduced to a powder it must be capable of being reconsolidated, without fusion, by the manipulation of temperature or the application of mechanical force or otherwise, and when so reconsolidated or recemented together, it must possess a sufficiently cohesive and tenacious structure as to admit of its being manipulated and divided into thin laminæ.

Soft or medium paraffine wax for example will serve for certain coloring agents as a suitable base.

In the accompanying drawing.

Fig. 1 is a plan on a highly magnified scale of a portion of a mottled color screen embodying the invention, and Fig. 2, a section on the line 2—2, Fig. 1.

A sufficient mass of the selected base is divided into as many portions as will agree with the number of coloring agents to be used, and these portions are thoroughly and uniformly stained or colored, each with its corresponding dye.

In the present instance three colors, to wit:—orange red 10, yellow green 12 and blue violet 13 are represented in Figs. 1 and 2.

These differently colored portions 10, 12, and 13 of the base having been independently liquefied by suitable means, as for example the action of heat, are placed in different containers of a multiple atomizing apparatus and synchronously nebulized into a congealing chamber, where to insure a still more intimate mixture of the colored ducts, the solidified particles are preferably simultaneously subjected to a rapid vertical activation by suitably positioned air jets.

The now comminuted base consisting of a mass of varicolored spherical particles, is removed from the congealing chamber and transferred in bulk to such forms or molds as may be required for the purpose to which the screen is to be adapted, and in these forms is subjected to such manipulation by pressure or otherwise, as will cause the various particles to coalesce and become reconsolidated into a block of the predetermined form.

The resulting block of compacted, and now amorphous, congeries is next so mounted in relation to a suitable microtome as to admit of being cut into laminæ, such as thin flat plates or tenuous ribbons *a*, of such size, length and thickness as may be desired, which product is represented in Figs. 1 and 2 on a highly magnified scale and constitutes a mottled color screen possessing the following desirable features, to wit:—It is provided with smooth upper and lower surfaces 14, 15 and has the colors 10, 12 and 13 arranged in individual colored portions substantially evenly distributed throughout the mass and adhesively affixed to one another to form a substantially uniformly cohesive structure or lamina capable of being manipulated as such, and having said colored portion substantially evenly distributed throughout the mass of the said lamina substantially without intervening interstices and being individually of substantially uniform color intensity throughout their mass.

These laminæ may be transferred to any suitable transparent support or backing and coated with or brought into contact with the desired photographic emulsion of any suitable known composition, and the whole then constitutes a color record plate or film of the prevailing "screen-plate" type but possessing very superior qualities.

These color record plates or films when suitably exposed and developed, if used as units, constitute a negative or positive photograph in colors which is a record of the varying colors of any optical image as modified by the color elements of the screen member of said screen plate.

If the photographically sensitive member of the screen plate after suitable exposure is separated from the screen member and developed, it constitutes a negative or positive photograph in monochrome, which is a record of the varying colors of the optical image as modified by the color elements of the screen member of said screen plate, and may be used independently of said screen member.

Claims:

1. The method of making mottled color screens which consists in assembling a plurality of varicolored members in such manner as to form a mass or aggregate which presents a plurality of said varicolored members in every dimension and which is substantially without interstices between adjacent varicolored members thereof shaping the colored mass or aggregate and cutting the mass or aggregate thus shaped into relatively thin laminæ or screen members.

2. The method of making mottled color screens which consists in spraying differently colored portions of a suitable base into a chamber, agitating the particles to thoroughly mix them within said chamber, congealing the mixed colored particles into mass form, molding the colored mass into the shape desired, and cutting the shaped mass into thin laminæ to form screen members.

In testimony whereof, I have signed my name to this specification.

ARTHUR W. CARPENTER.